United States Patent Office 2,972,205
Patented Feb. 21, 1961

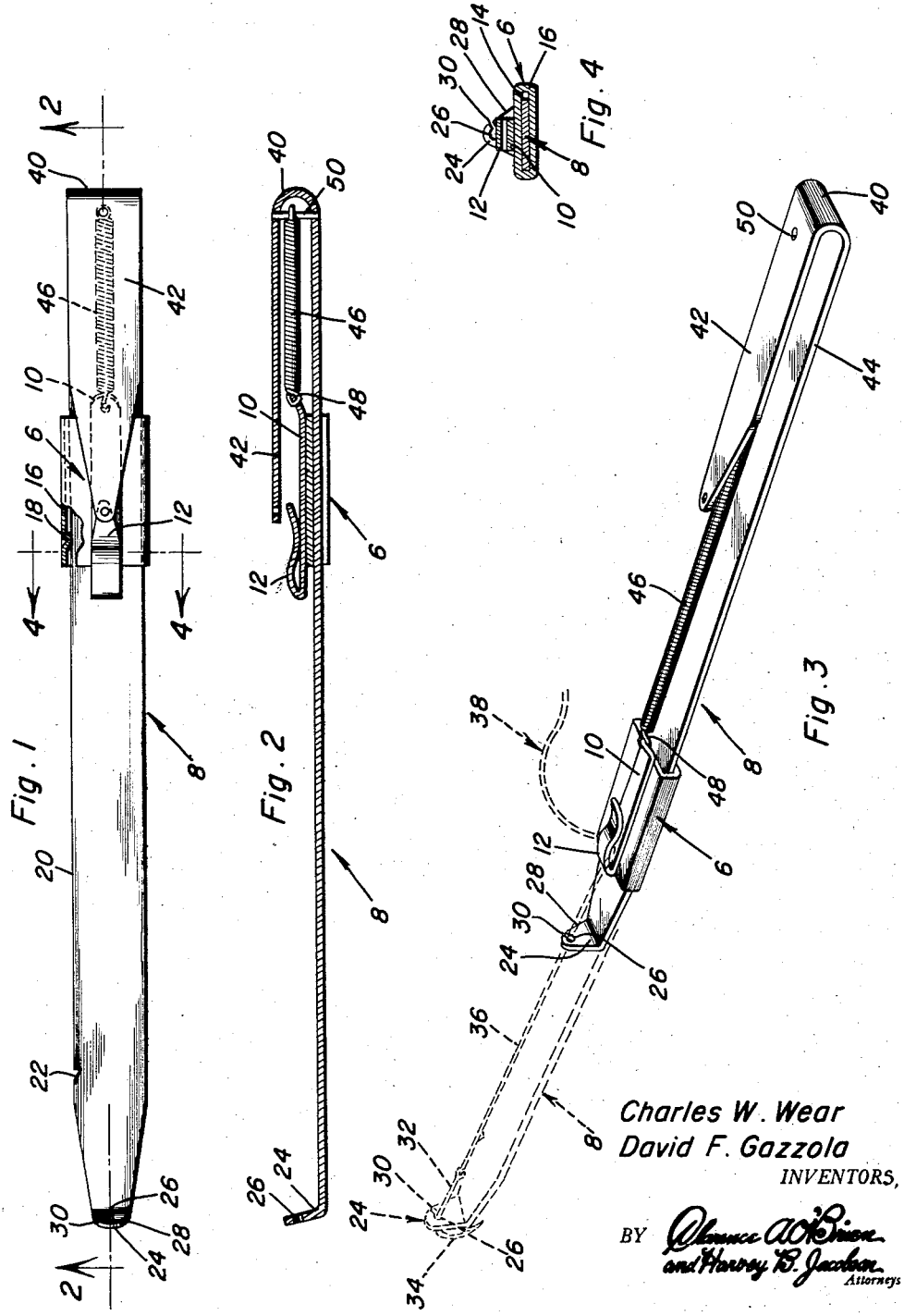

2,972,205

FISHHOOK DISGORGER

Charles W. Wear, Naches, Wash., and David F. Gazzola, Box 561, Selah, Wash.; said Wear assignor to said Gazzola Filed Apr. 18, 1957, Ser. No. 653,557

5 Claims. (Cl. 43—53.5)

The present invention relates to a manually usable tool or implement which is expressly adapted for use by a fisherman and is suitably constructed and designed to mechanically hold and make use of the line in locating and removing a fishhook from a hooked fish.

As the preceding statement of the invention implies, fishhook locating and extracting devices are old and well known. Therefore, the obvious objective revealed is to structurally, functionally and otherwise improve upon similarly constructed and performing fishhook locating and removing devices. To this end a structurally distinct and novel implement is offered.

Generally speaking, the problem confronting the average fisherman, after a fish has been hooked, is ordinarily as follows. The fish must be held, the hook engaging and removing tool or implement must be held and, in addition a line must be held. Since the fisherman does not have three hands to perform a three-handed fishhook removing task, the tool or implement must be so constructed that it takes the place of the "third hand" and such is the purpose of the locating and removing implement herein under consideration. Therefore, it is an object of the invention to provide a simple, practical and an effective device or implement which, after being preset, can be operated with the use of one hand and so that the fish can be held in the other hand.

Briefly, the improved implement is characterized by a bar supporting and aiming member comprising a sleeve. The sleeve is adapted to be gripped between the thumb and first joint of the forefinger of one hand, say the right hand. A bar-like member, herein referred to as a spring-biased projectable bar, is slidably mounted and supported in the sleeve. There is a guide and retainer on the leading end of the bar which is slidably connectable with that portion of the fishing line which is located between the forward end of the sleeve and the fishhook. A spring clip is fixed on the sleeve so that a portion of the fishing line adjacent to the lodged fishhook may be temporarily and releasably connected with the clip. The bar is adapted to be slidingly grasped by the fingers of the same hand that holds the sleeve. A coil spring is connected to the rearward or outer end of the sleeve and the trailing end portion of the bar in a manner to be hereinafter described in detail.

Other objects, features and advantages will become more readily apparent from the following description and the accompanying drawing.

In the drawing:

Fig. 1 is a plan view with a portion shown in section, of the improved fishhook extractor with the parts in normal out-of-use relationship.

Fig. 2 is a section on the central line 2—2 of Fig. 1.

Fig. 3 is a perspective view wherein the spring projected bar is releasably latched in the sleeve in what may be described as a cocked position and wherein the phantom lines show the bar projected, and Fig. 4 is a cross section on the line 4—4 of Fig. 1.

The implement is characterized by three principal parts or components; namely, the aforementioned bar 8, a coil spring, and supporting and aiming sleeve 6 which in practice is adapted to be gripped and held close to the mouth of the fish by the fingers of the hand. The sleeve is, compared to the bar, relatively short and is a straight open-ended tube rectangular in cross section. Fixed atop the sleeve is the arm 10 of the aforementioned rearwardly opening spring clip 12. The bar comprises a flat, rigid bar which in practice is eight or ten inches in length. This bar is fitted snugly in the sleeve for free sliding and as brought out in Fig. 4 there is a slight clearance between the edge portion 14 and the adjacent wall of the sleeve, that is the wall 16. This wall as best shown in Fig. 1 is provided with an indentation 18 defining a detent or keeper which slides along the edge 20 and is releasably engageable in the keeper notch or seat 22. This notch is just inwardly of the laterally directed substantially V-shaped terminal or tip 24. This tip is provided with a centered hole 26 at the apex portion and the marginal edges 28 converge toward the apex and there is a radial slit 30 which opens through one edge. Thus the slit and opening is somewhat keyhole-like in form. The diameter of the hole is sufficient to clear the eye and shank 32 of the fishhook 34. The slit 30 is restricted and allows only the leader portion 36 of the fishing line 38 to pass therethrough.

There is a return bend 40 at the right hand end of the bar joining a terminal portion 42 and thus the bent terminal portion and underlying part 44 of the bar provide a sheath (Figs. 1 and 2) for the coil spring 46. The coil spring parallels the bar and has its leading end 48 joined to the clip arm 10 and its other end anchored on an anchoring pin 50 at the trailing end of the bar as is clear from the drawing.

Normally the coil spring 46 is contracted and assumes the position seen in Figs. 1 and 2. Therefore the sleeve 6 is in its out-of-use position in these two figures. On the other hand when the device is cocked and set for locating and removing a fishhook which is embedded in the body of the fish the sleeve is to the left and the bar is extended to the right where it assumes its "ready-to-fire" position. As is brought out in Fig. 3 it is necessary to thread the leader 36 of the fishing line through the slit 30 to eye or hole 26 when using the implement. The leader can be forced into the eye by way of the side kerf or slit 30 in a seemingly obvious manner. Also it is repeated that the diameter of the eye or hole is slightly larger than the cross section of the fishhook eye and shank 32 so that this laterally directed leading end 24 functions as a thrust surface when it is engaged with the bent portion of the fishhook and assists in its removal.

As has been previously mentioned, this device is completely operated with one hand while the other hand holds the fish. The thumb of the hand holding the device is usually used to push the line or leader under the spring clip on top of the sleeve after the device has been cocked. More particularly, the fish (not shown) is held in one hand with the mouth toward the fisherman. The implement or device is held in the other hand with the sleeve 6 gripped between the thumb and first joint of the forefinger. The trailing end of the push-pull bar 8 is at the same time also lightly grasped with the inner rear part of the hand. (This is an aid in controlling the sliding action of the locator bar.) The extreme left end 24 of the loosening and extracting bar is pressed against the fisherman's body or some other suitable object until the detent 18 engages in the notch 22. The implement is now set and ready. Approximately 1½" from the mouth of the fish the line is engaged under the spring clip 12. This is usually done with the thumb, which has been temporarily moved from its grip on the sleeve—the same now being in the locked position. The line is then entered into the hole 26 by way of the slit or slot 30. Regripping the device once more, as has been explained previously, slight pressure is exerted with the thumb (if the right hand is used) against the side of the sleeve opposite the detent 18. The slight clearance slot 14 permits the bar and sleeve to be moved relative to each other so that the detent or keeper 18 jumps out of the keeper seat and the bar or locator now moves in the direction of the fish and into the fish's mouth, while the lateral guide 24 rides along the leader permitting the hole 26 to pass over the eye and shank 32 of the fishhook 34 and into the bent portion of the fishhook. The terminal portion 42 of the bar has been automatically permitted to slide gently into the hand at this point where it is now grasped more tightly and pushed so that the left end 24 of the bar exerts pressure against the bent portion of the hook, removing and withdrawing it.

It will be evident that the return bend forming the sheath is only long enough to cover the spring when the spring is retracted. The construction will serve to bring the adjacent end or edge portion of the sleeve under the free end of 42 and with this construction the coil spring is shielded and is prevented from snagging with any other nearby object when the spring is retracted. It is also to be explained that the plunger behind the sleeve is held slightly by the hand and when the sleeve is released from the notch 22 at the left hand end of the bar the spring will "pull" the terminal end portion 42 gently into the user's hand where it is then more firmly grasped and the fishhook can be gently removed from the fish. The spring is of such tension that it does no more than to pull the very light weight of the locator bar through the sleeve so that the left end can pilot itself into the bent portion of the fishhook.

Changes in shape, size, rearrangement of parts may be resorted to in actual practice without departing from the spirit of the invention or the scope of the invention as claimed.

What is claimed as new is as follows:

1. A self-locating fishhook loosening and extracting implement comprising an implement aiming, supporting and triggering sleeve which is constructed and adapted to be gripped and held by the fingers of one hand close to and lined up with the mouth of the fish, said sleeve having line hitching and anchoring means fixed thereon and to which a portion of a fishing line may be releasably connected, tautened and placed under tension, a fishhook dislodging and extracting bar slidably but non-rotatably mounted in said sleeve with portions thereof extending beyond the ends of said sleeve, said bar having a leading end provided with a guide forwardly of and in alignment with the anchoring means on said sleeve and adapted to be slidingly connected with the tensioned portion of the fishing line between the end which is anchored on said means and the fishhook and being also adapted to ride along on the tensioned portion of the line and thus piloted toward the fishhook in a manner to line itself up with the shank of the fishhook and slide over the fishhook's eye and then forwardly along the shank until it engages the bent portion of the fishhook, and a bar actuating spring having one end fixed to the trailing end of the bar and the other end connected to said sleeve, a portion of said bar being provided adjacent said guide with a keeper notch, and said sleeve having a keeper releasably engageable with the bar when the keeper is seated in said keeper notch.

2. The structure defined in claim 1 and wherein said sleeve comprises a flat tube of a length appreciably less than the length of the bar and said bar comprises a flat faced bar which is slidable freely but non-rotatably in the surrounding sleeve.

3. The structure defined in claim 1 and wherein said spring comprises a lightweight coil spring, said spring having a restricted degree of tension just sufficient when active to slide the major portion of said bar through and beyond the sleeve, and said guide comprising a laterally bent leading end portion of said bar provided with an opening providing a guide eye, and there being a radial line inserting slit communicating at one end with the eye and opening at its opposite end through a marginal edge of the laterally bent leading end portion.

4. A fishhook locating, freeing and withdrawing implement comprising a sleeve rectangular in cross-section adapted to be held with the fingers of one hand, an elongated bar member slidable but not rotatable in said sleeve, said bar member being of a length appreciably greater than the length of said sleeve, a portion of said bar member between the ends of the bar member being slidably mounted in said sleeve, the end of said bar member forwardly of said sleeve having a guide eye and a line inserting slit opening at one end into the guide eye, and a line attaching spring clip fixed on said sleeve in alignment with said guide eye and adapted to permit a predetermined portion of the line leader to be temporarily attached to said guide eye and tensioned after a portion of the leader in advance thereof has passed through the slit and into said guide eye, and a coil spring attached at one end thereof to the sleeve and having its other end fastened on the trailing end portion of said bar, the last named end portion of the bar being bent upon itself and providing a return bend spaced from and cooperating with the adjacent end portion of the bar and overlying the coil spring and constituting a guard-like sheath for the coil spring when the spring is not under tension.

5. A fish hook dislodger comprising an elongated body portion provided at its forward end with an opening having its longitudinal axis extending longitudinally of said body portion, said opening passing through the forward end of said body portion, a trigger device mounted upon the exterior of said body portion, the body portion being shiftable longitudinally with relation to the trigger device when the trigger device is held by the fingers against movement, means to guide the body portion upon the trigger device, means to automatically move the body portion forwardly with relation to said trigger device when said body portion is released, said last named means including a spring, detachable means for securing the body portion to the trigger device when the body portion is shifted to its rear position with respect to the trigger device, the arrangement being such that a fishing line carrying the hook is movably mounted in the opening at the forward end of the body portion and is extended longitudinally of the body portion to reach the exterior of the trigger device against which it may be clamped by the finger, the body portion being guided along the line in its forward movement when it is released by the trigger device and moved forwardly by the spring.

References Cited in the file of this patent
UNITED STATES PATENTS

| | | |
|---|---|---|
| 1,728,864 | Kramer | Sept. 17, 1929 |
| 2,512,818 | Wikarski | June 27, 1950 |
| 2,537,879 | Culhane | Jan. 9, 1951 |
| 2,722,080 | Lemberger | Nov. 1, 1955 |

FOREIGN PATENTS

| | | |
|---|---|---|
| 3,292 | Great Britain | 1886 |
| 235,367 | Great Britain | June 18, 1925 |